United States Patent [19]

Jasinski

[11] Patent Number: 5,689,077
[45] Date of Patent: Nov. 18, 1997

[54] MUSICAL SCORE DISPLAY AND AUDIO SYSTEM

[76] Inventor: Thomas J. Jasinski, 1378 White Rd., Phelps, N.Y. 14532

[21] Appl. No.: 713,918

[22] Filed: Sep. 13, 1996

[51] Int. Cl.⁶ .................................................. G09B 15/02
[52] U.S. Cl. ..................... 84/477 R; 84/483.1; 84/483.2; 84/DIG. 6
[58] Field of Search ..................... 84/477 R, 482, 84/483.1, 483.2, DIG. 6

[56] References Cited

U.S. PATENT DOCUMENTS 4,350,070  9/1982  Bahu .............................. 84/1.03
5,400,687  3/1995  Ishii .............................. 84/477 R
5,588,166  12/1996  Burnett ........................... 5/503.1

*Primary Examiner*—William M. Shoop, Jr.
*Assistant Examiner*—Marlon Fletcher
*Attorney, Agent, or Firm*—David L. Volk

[57] ABSTRACT

A disc player is electronically connectable to a foot operated controller and a monitor is electronically connectable to the player. The monitor includes speakers for audio output and a screen for video output. The monitor further includes sheet music clips for attaching sheet music to the monitor and music stand clips for attaching the monitor to a music sheet holder of a music stand.

4 Claims, 6 Drawing Sheets

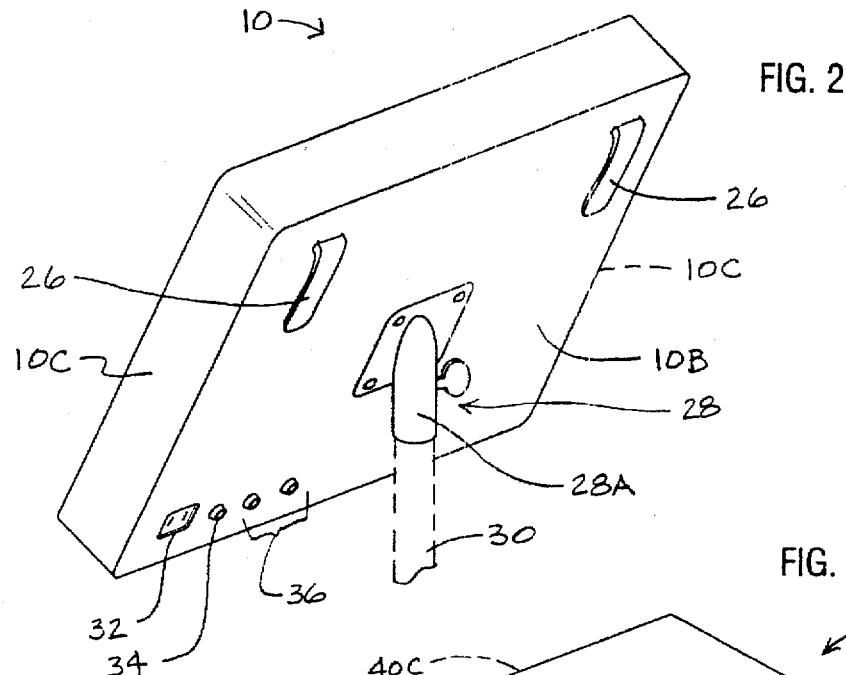
FIG. 2
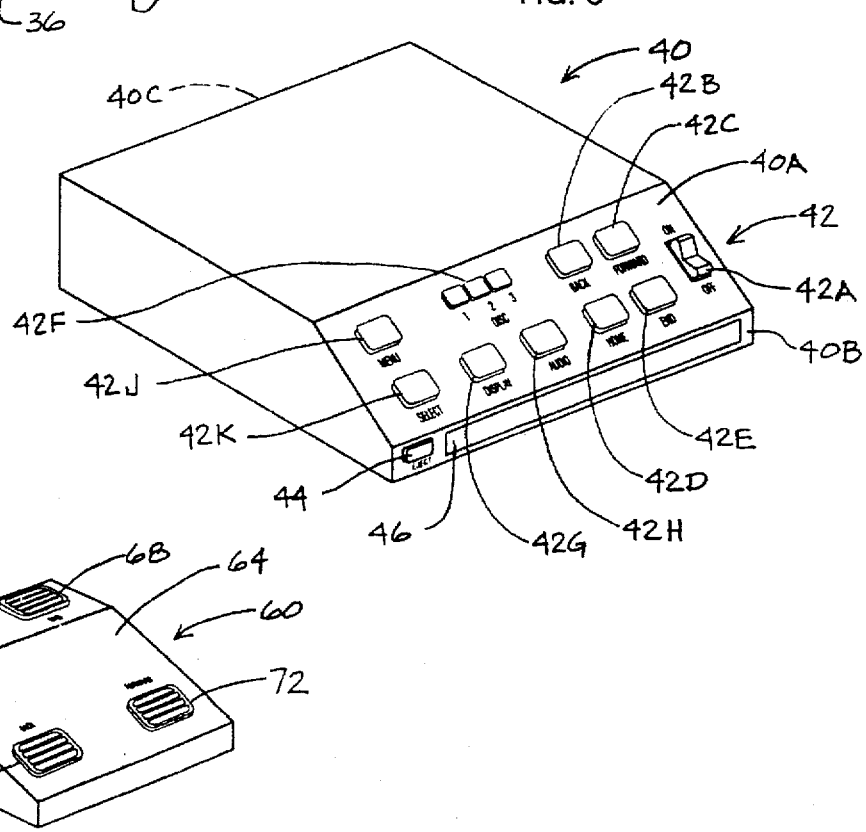
FIG. 3
FIG. 4

5,689,077

MUSICAL SCORE DISPLAY AND AUDIO SYSTEM

BACKGROUND OF THE INVENTION

1. Field of the Invention

The present invention relates to audio and video systems, specifically to a device for displaying a musical score and playing pre-recorded audio performances of the musical score being displayed.

2. Description of the Related Art

Amateur and professional musicians alike must contend with a common problem involving the handling, storage and organization of sheet music. When playing an instrument, the musician must quickly turn the pages of the sheet music while trying not to interrupt the playing of the musical piece. In the case of professional pianists, a second person is required to turn pages of sheet music during a performance.

Once a large amount of sheet music has been collected by a musician over time, it can become a huge organizational task to establish a system for keeping track of it all. More often than not, the task of organizing is so daunting that the sheet music never becomes organized at all. Instead, the musician spends a lot of time and experiences frustration as he or she looks through stacks of books and papers for a desired piece.

An apparatus which displays a musical score on a monitor would solve the problem of having to turn pages while playing. Such an apparatus could be controlled by a device positioned on the floor and manipulated by the musician's foot, leaving the hands free for uninterrupted playing. The musical score displayed on the monitor could be stored on a compact disc, thus solving the problem of large, unorganized stacks of sheet music.

A further advantage would be realized if such an apparatus could also play an audio performance of the score being displayed. This feature could be used to provide instrumental or vocal accompaniment to the live performance. This feature could also be used for the educational purposes, permitting the student to hear a professional performance while watching the score, and to play along, keeping time with the performer and noticing and emulating the performer's techniques.

SUMMARY OF THE INVENTION

The musical score display and audio system of the present invention includes a disc player for playing pre-recorded audio and video information. The disc player is electronically connectable to a foot operated controller and a monitor is electronically connectable to the player. The monitor includes speakers for audio output and a screen for video output. The monitor displays a musical score on a screen thereon, and has the capability of concurrently playing a pre-recorded performance of the musical score.

The monitor further includes sheet music clips for attaching sheet music to the monitor and music stand clips for attaching the monitor to a music sheet holder of a music stand.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 2 is a rear perspective view of the monitor, shown mounted to a vertical support member of a music stand;

FIG. 3 is a perspective view of a compact disc player for use in conjunction with the monitor;

FIG. 4 is a perspective view of a foot-activated controller.

DETAILED DESCRIPTION

Figure 1:
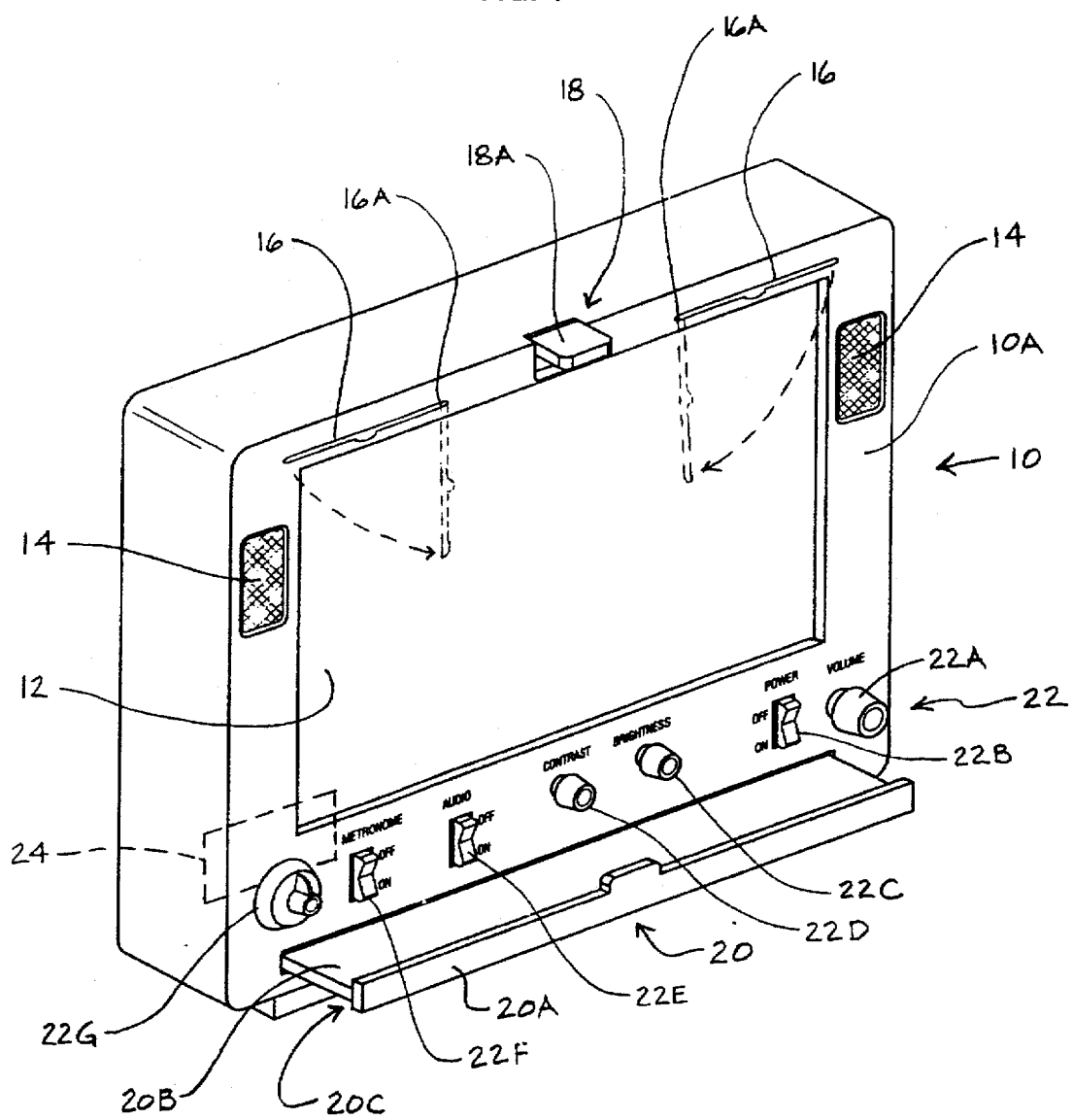
FIG. 1 is a front perspective view of a musical score display monitor.

FIG. 1 is a front perspective view of a musical score display monitor 10 having an anti-glare display screen 12 for displaying a musical score thereon, the screen 12 disposed on the front face 10A of the monitor 10. The musical score is displayed two pages at a time, the first page displayed to the left on the screen 12 and the second page displayed to the right on the screen 12. When the display is advanced by one page as described hereinafter, the page on the right moves to the left and a new page is displayed on the right.

A speaker 14 is disposed adjacent each side of the screen 12 for playing audio associated with the musical score being displayed. The audio may be a recorded performance of one or more instrumental or vocal parts of the musical score which would be displayed simultaneously on the screen 12.

A clip 16 is disposed above the screen 12 near each side thereof. The clips 16 are for attaching standard paper sheet music (not shown) to the monitor 10 when the present invention is not being used for its main purpose of displaying sheet music on the screen 12. This may occur, for example, when the desired sheet music is unavailable in a displayable format. The clips 14 are pivotally attached to the monitor 10 at their inward ends 16A, so that they may be pivoted downward as indicated by the dotted arrows of FIG. 1 to hold the sheet music in place.

Figure 1A:
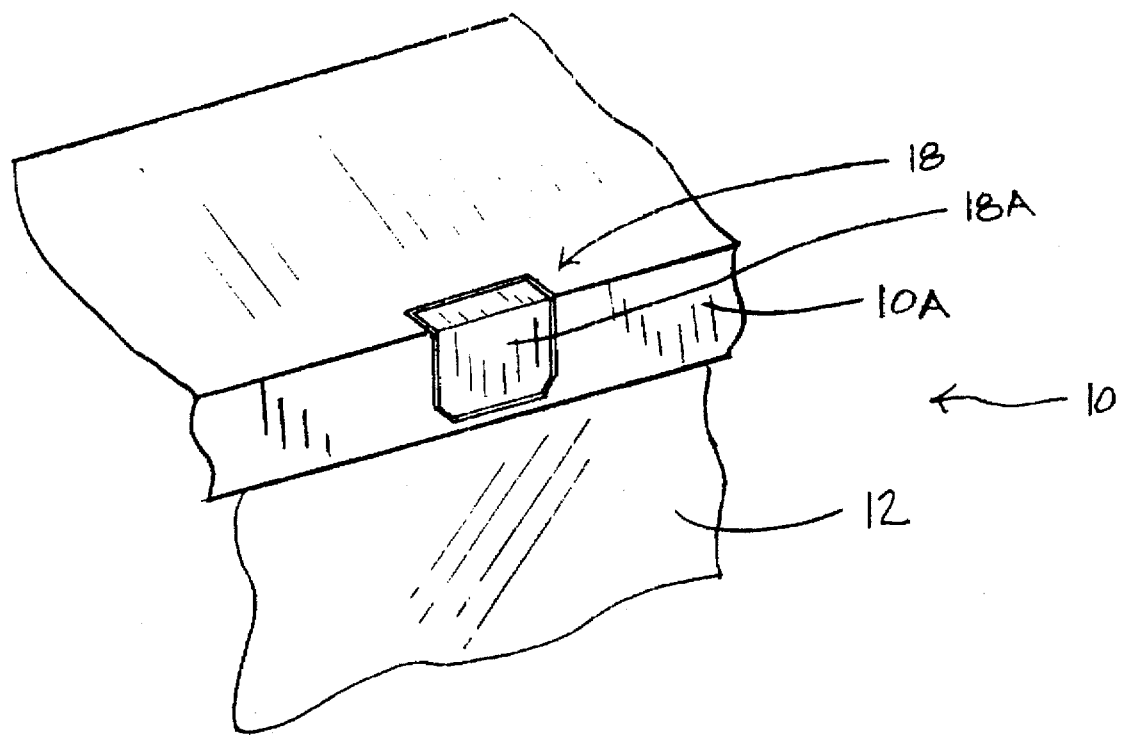
FIG. 1A is a partial perspective view of the monitor showing the lamp in a downward position.

A lamp 18 is pivotally and springedly attached to the monitor 10 above the screen 12 and between the clips 16. The lamp 18 is attached to the monitor 10 and configured such that it moves from a downward position wherein an outer surface 18A of the lamp 18 is flush with the front face 10A of the monitor 10 to an upward position wherein the lamp 18 is positioned to shine downward and illuminate sheet music attached by its top edge to the clips 16. When the lamp 18 is in a downward position and a user presses on the outer surface 18A and then releases pressure, the lamp 18 springs to the upward position. The lamp 18 is shown in the downward position in FIG. 1A. Because such a pressure operated springing device is well known in the prior art, the details thereof are not disclosed herein.

A sheet music support apparatus 20 is disposed near the bottom of the monitor 10 and parallel to the bottom edge of the monitor 10. The support apparatus 20 is configured to slide in and out of the monitor 10 through the front face 10A. The support apparatus 20 includes an upwardly directed lip 20A connected to a substantially planar shelf 20B. The lip 20A is connected to the free end 20C of the shelf 20B. The shelf 20B slides in and out of the monitor 10 when a user grabs the lip 20A and pushes or pulls the shelf 20B. The support apparatus 20 provides support for the sheet music (not shown) by resting the bottom edge of the sheet music against the shelf 20B. The clips 16 used in conjunction with the support apparatus 20 hold and support the sheet music against the monitor 10.

A series of controls 22 are disposed on the front face 10A of the monitor 10 below the screen 12 and above the support apparatus 20. The controls 22 include:

a. a volume control 22A for adjusting the volume of the audio output through the speakers 14;

b. a power on-off switch 22B for controlling power to the monitor 10;

c. a brightness control 22C for adjusting the brightness of the display on the screen 12;

d. a contrast control 22D for adjusting the contrast of the display on the screen 12;

e. an audio on-off switch 22E for turning on and off the audio output of the recorded performance;

f. a metronome on-off switch 22F for turning on and off a metronome 24 built into the monitor 12; and g. a metronome adjustment control 22G for adjusting the tempo of the metronome 24.

The metronome 24 plays a conventional metronome sound through the speakers 14 when it is activated.

Figure 2A:
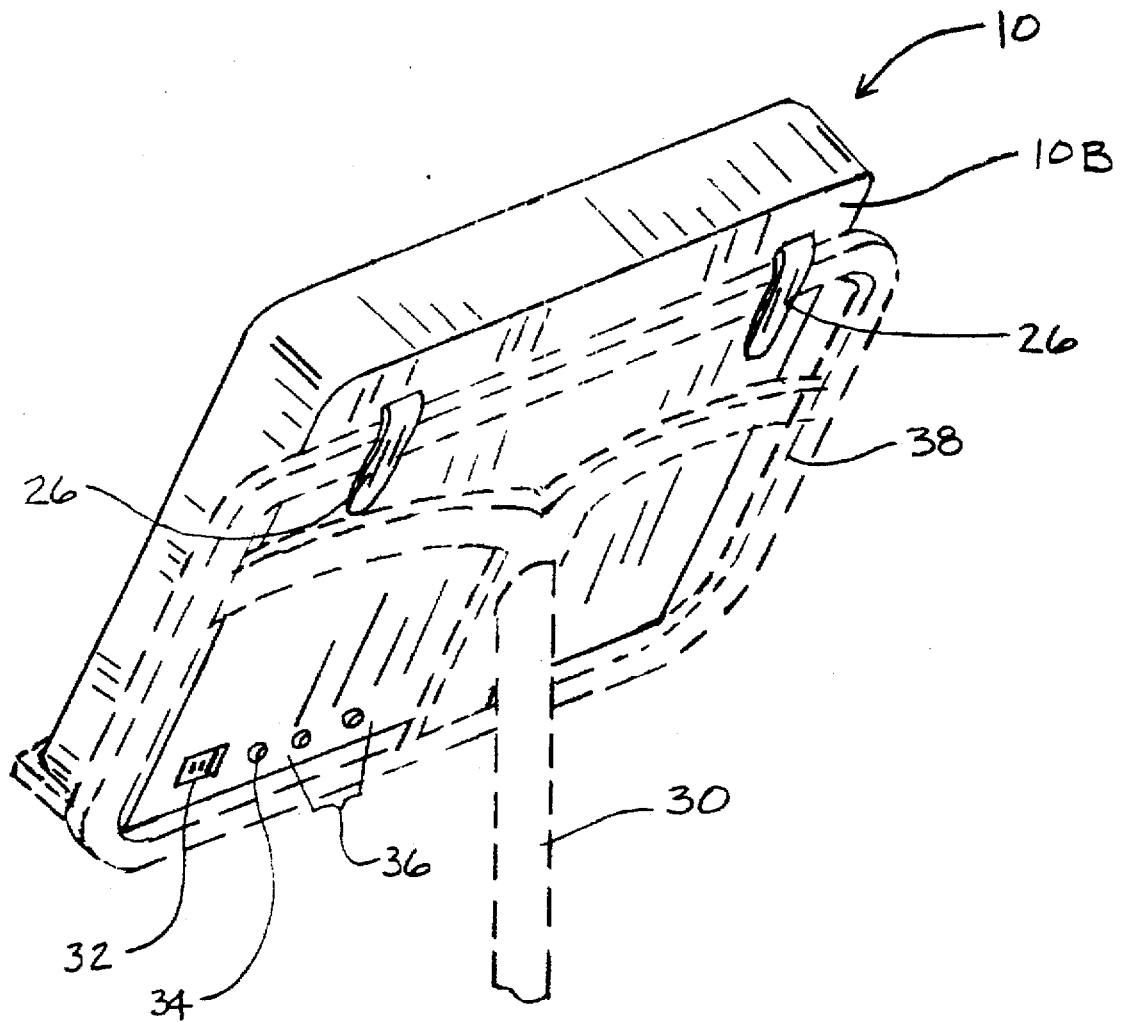
FIG. 2A is a rear perspective view of the monitor, shown mounted to a music sheet holder of a music stand.

FIG. 2 is a rear perspective view of the monitor 10, shown mounted to a vertical support member 30 of a conventional music stand. A mounting device 28 is removably attached to a rear face 10B of the monitor 10. The mounting device includes a sleeve 28A configured and positioned to receive the vertical support member 30. When the monitor 10 is attached to the vertical support member 30 in this manner, the monitor 10 replaces a music sheet holder 38 (see FIG. 2A) which is normally attached to the vertical support member 30.

FIG. 2A is a rear perspective view of the monitor 10, shown mounted to the music sheet holder 38 of a music stand, using music stand clips 26 which are mounted to the rear face 10B of the monitor. When the monitor 10 is attached to the music sheet holder 38 in this manner, the mounting device 28 is removed from the monitor 10.

Referring back to FIG. 2, the monitor 10 includes a power cord jack 32 disposed on the rear face 10B thereof, configured to accept a power cord (not shown) for providing AC power to the monitor 10. A compact disc player input jack 34 is disposed on the rear face 10B of the monitor. The player input jack 34 is for receiving a compact disc cable (not shown) for electronically connecting a compact disc player 40 (FIG. 3) to the monitor 10. Speaker jacks 36 for connection to external speaker cables (not shown) are disposed on the rear face 10B of the monitor 10. Alternatively, the power cord jack 32, the player input jack 34 and the speaker jacks 36 may be located on a side face 10C or the front face 10A of the monitor 10.

FIG. 3 is a perspective view of the compact disc player 40. The compact disc player 40 may be attached by brackets (not shown) to the underside of a keyboard instrument (not shown). The player 40 plays a compact disc (not shown) which includes the digitally stored musical scores and audio musical performances. The player 40 may be capable of storing multiple compact discs and automatically playing any of the stored discs which a user selects.

A plurality of player controls 42 are disposed on a front surface 40A of the player 40. The player controls 42 include:

a. a player on-off switch 42A for turning the player 40 on and off;

b. a back button 42B for moving the musical score display on the screen 12 back one page;

c. a forward button 42C for advancing the musical score display on the screen 12 forward one page;

d. a home button 42D for displaying the first page of the musical score on the screen 12;

e. an end button 42E for displaying the last page of the musical score on the screen 12;

f. disc selection buttons 42F for selecting which disc will play;

g. a display button 42G which toggles on and off the playing of the disc;

h. an audio button 42H for toggling on and off the audio performance;

i. a menu button 42J for displaying on the screen 12 a list of musical selections available on the selected disc; and j. select button 42K for choosing a musical selection for play. When the select button 42K is pressed, the musical selections on screen are alternately highlighted to indicated the current choice.

When the audio button 42H is pressed to toggle the audio performance on, the musical score display is automatically advanced to correspond with the audio performance, displaying whatever is currently being played audibly. When the audio button 42H is pressed to toggle the audio performance off, the musical score display does not change until the back button 42B, the forward button 42C, the home button 42D, the end button 42E, or one of the controls on a foot activated controller 60 (FIG. 4) is pressed.

The player 40 includes a lower front surface 40B disposed below and adjacent the front surface 40B. A disc slot 46 and an eject button 44 are disposed on the lower front surface 40B. The disc slot 46 is configured and operates the same as for conventional disc players, accepting and ejecting a disc (in the case of single disc players) or a multiple disc holding magazine (in the case of multiple disc players). The eject button 44 operates the same as for conventional disc players, causing a disc or magazine to eject through the disc slot 46 when the eject button 44 is pressed.

Figure 3A:
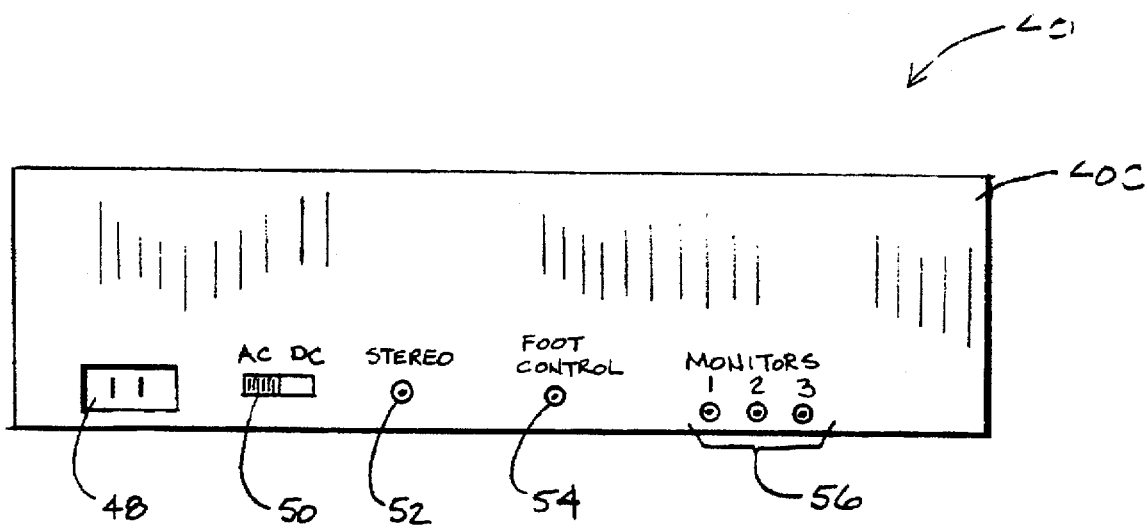
FIG. 3A is a rear elevational view of the compact disc player.

FIG. 3A is a rear elevational view of the compact disc player 40, showing the rear surface 40C. Disposed on the rear surface 40C are:

a. a player power cord jack 48 configured to accept a power cord (not shown) for providing AC power to the player 40;

b. a power selector switch 50 for alternately running the player from AC or battery power;

c. a stereo jack 52 for connecting a stereo cable (not shown) for running the player 40 through an external stereo system (not shown);

d. a controller jack 54 for receiving a controller cable (not shown) for electronically connecting the foot activated controller 60 to the player 40; and e. monitor jacks 56 for receiving monitor cables (not shown) for electronically connecting up to three monitors 10 to the player 40.

FIG. 4 is a perspective view of the foot-activated controller 60. The controller 60 is normally placed on the floor (not shown) in front of a musician (not shown). The controller 60 has a first surface 62 and a second surface 64 adjacent the first surface 62. When the controller 60 is set on the floor for use in front of a musician, the first surface 62 faces upward and the second surface 64 faces toward the musician at a declined acute angle with respect to the plane of the first surface 62.

The first surface 62 includes a home switch 66 and an end switch 68, which have the same functions as the home button 42D and the end button 42E previously described, respectively. The second surface 64 includes a back switch 70 and a forward switch 72 which have the same functions as the back button 42B and the forward button 42C previously described, respectively. Each of the switches 66, 68, 70, 72 are activated by pressing with a user's foot. Thus, the controller 60 permits hands-free manipulation of the display of the musical score on the screen 12.

Because the second surface 64 faces the musician and is closer to the musician than the first surface 62, the second surface 64 is more easily accessible than the first surface 62. Because the most commonly used switches, namely the back switch 70 and the forward switch 72 are disposed on the second surface 64, they are more easily accessed than the home switch 66 and the end switch 68, which are less commonly used.

Because the home switch 66 and the end switch 68 are more difficult to access than the back switch 70 and the forward switch 72, the chances of inadvertently pressing the home switch 66 or the end switch 68 are minimal. Because pressing the home switch 66 or the end switch 68 may move the display back or ahead several pages, it is important not to inadvertently press one of them.

Figure 5:
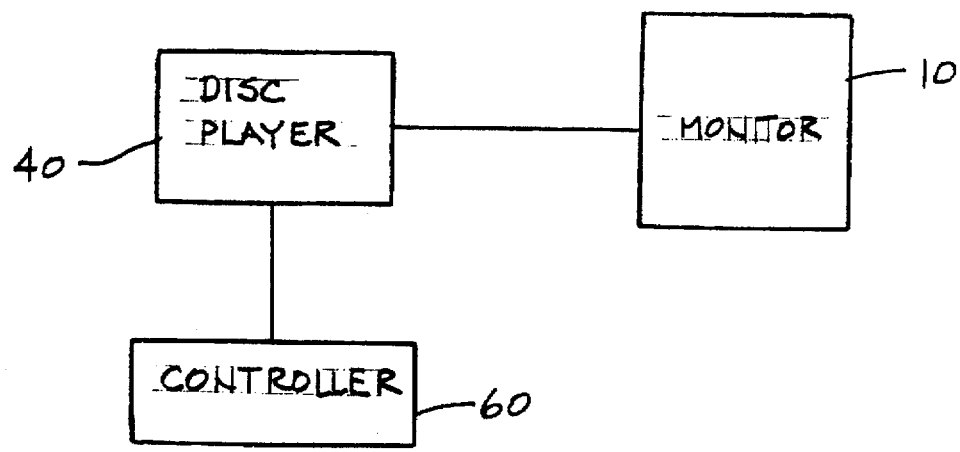
FIG. 5 is a schematic of the musical display and audio system.

FIG. 5 is a schematic of the controller 60, the disc player 40 and the monitor 10 configured and arranged as already described. The disc player 40 is controlled by the foot operated controller 60 to display musical scores and play accompanying audio through the monitor 10. The present invention may be manufactured using well known audio and video disc player technology, such as that embodied in the products known as laser disc players in which the audio and visual components of movies are stored on LP-sized laser disc, played on laser disc players, and shown on home television systems. Because such technology is well known, anyone skilled in the art would be able to manufacture and use the present invention using the information disclosed herein.

Figure 6:
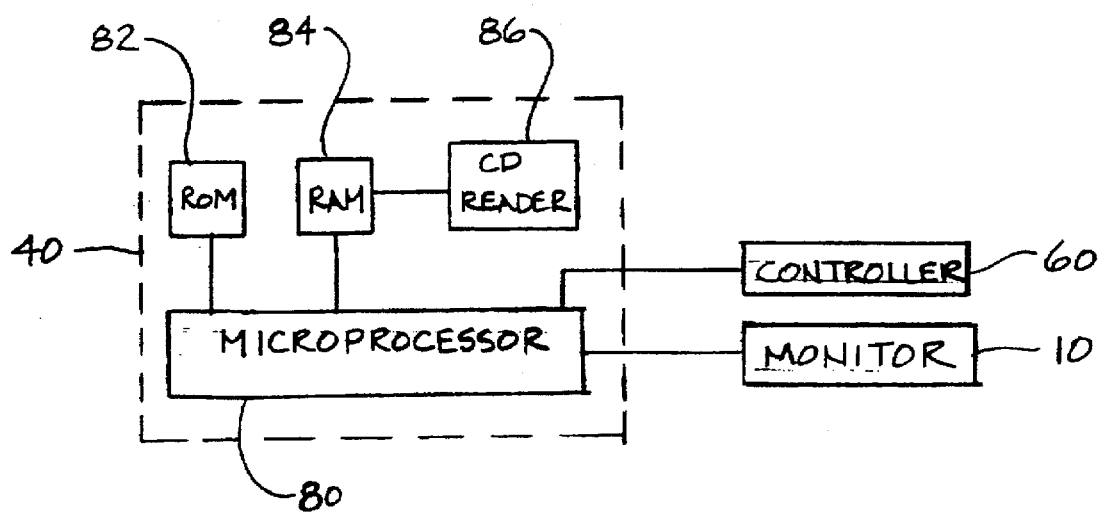
FIG. 6 is a schematic illustrating one embodiment of the musical display and audio system using micro-computer technology.

The present invention could also be manufactured using micro-computer technology as shown in FIG. 6. In such an embodiment, the player 40 would include a microprocessor 80, a read only memory 82, a random access memory 84 and a CD reader 86. As in current micro-computers, the CD reader 86 uses standard laser and electronic technology to send the audio and visual information stored thereon to the random access memory 84. The microprocessor 80 acts upon instructions from the read only memory 82 to interpret the data received from the random access memory 84 and the controller 60 to send electronic signals to the monitor 10 where the signals are converted to audio and video output.

Thus the apparatus of the present invention solves the problem of having to turn pages of sheet music while playing, leaves the hands of a musician free for uninterrupted playing, solves the problem of large, unorganized stacks of sheet music, can provide instrumental or vocal accompaniment to a live performance, and can be used for the educational purposes.

The foregoing description is included to describe the preferred embodiment of the present invention, and is not meant to limit the scope of the invention. From the foregoing description, many variations will be apparent to those skilled in the art that would be encompassed by the spirit and scope of the invention. The scope of the invention is to be limited only by the following claims and their legal equivalents.

The invention claimed is:

1. A musical score display system comprising:
  a. a monitor including a screen;
  b. a means for showing a musical score display on the screen;
  c. the monitor including a sheet music attachment means for attaching a top edge of sheet music to the monitor, above the screen; and
  d. a shelf configured to slide in and out of the monitor, for supporting a bottom edge of the sheet music.

2. The system of claim 1, wherein the monitor further comprises a light fixture including a light source and configured to move from a first position in which the light source is concealed to a second position in which the light source is positioned to illuminate the sheet music.

3. The system of claim 1, wherein the sheet music attachment means includes a plurality of clips pivotally attached to the monitor near a top edge of the screen.

4. A musical score display system comprising:
  a. a monitor including a screen;
  b. a showing means, for showing a musical score display on the screen;
  c. a controlling means, for controlling the showing means;
  d. the controlling means comprising a foot operated controller including a first surface and a second surface disposed at an acute angle to a plane of the first surface, the first surface facing substantially upward and the second surface adapted to generally face toward a user when the controller is positioned on a floor for use;
  e. the first surface including a home switch for controlling the showing means to show a first page of the display on the screen, and an end switch for controlling the showing means to show a last page of the display on the screen;
  f. the second surface including a back switch for controlling the showing means to show an immediately previous page of the display on the screen, and a forward switch for controlling the showing means to show an immediately following page of the display on the screen.

* * * * *